(No Model.) 6 Sheets—Sheet 1.

J. D. BILLINGS & D. MUELLER.
HORSESHOE MACHINE.

No. 330,670. Patented Nov. 17, 1885.

Fig 1

Witnesses
H. D. Williams
E. S. Coy.

John D. Billings,
David Mueller,
Inventors
per Alfred Shedlock,
Atty.

(No Model.) 6 Sheets—Sheet 4.

J. D. BILLINGS & D. MUELLER.
HORSESHOE MACHINE.

No. 330,670. Patented Nov. 17, 1885.

(No Model.) 6 Sheets—Sheet 5.
J. D. BILLINGS & D. MUELLER.
HORSESHOE MACHINE.
No. 330,670. Patented Nov. 17, 1885.

Witnesses
H. D. Williams
E. S. Coy.

John D. Billings,
David Mueller,
Inventors
pe Alfred Shedlock
Atty.

(No Model.) 6 Sheets—Sheet 6.

J. D. BILLINGS & D. MUELLER.
HORSESHOE MACHINE.

No. 330,670. Patented Nov. 17, 1885.

Witnesses
H. D. Williams
E. S. Coy.

John D. Billings.
David Mueller.
Inventors
per Alfred Theolock
Atty.

UNITED STATES PATENT OFFICE.

JOHN D. BILLINGS AND DAVID MUELLER, OF NEW YORK, N. Y., ASSIGNORS OF ONE-HALF TO FRANK FULLER, OF SAME PLACE.

HORSESHOE-MACHINE.

SPECIFICATION forming part of Letters Patent No. 330,670, dated November 17, 1885.

Application filed April 3, 1885. Serial No. 161,097. (No model.)

*To all whom it may concern:*

Be it known that we, JOHN D. BILLINGS and DAVID MUELLER, both citizens of the United States, and residents of New York, county and State of New York, have invented certain new and useful Improvements in Machines for Forming and Bending Horseshoes, of which the following is a specification.

This invention has for its object the construction of a machine adapted to form horseshoes from a plain bar of heated iron at one operation and converting the whole bar into shoes.

It consists of a pair of feeding and blank-forming rollers arranged to feed the blank-bar horizontally and form it into blanks; a vertically-arranged cutter for separating the blanks and forming their ends, during which operation the feeding-rollers are at rest; a forming-plunger and folders for forming the blanks into shoes as they are cut off from the bar by the cutter, arranged to operate horizontally at right angles to the direction of motion of the blank-bar fed by the feeding and forming rollers, and a vertically-operating stripper for forcing the formed shoes off from the folding-plunger.

The various parts of the machine are adjustable, and the bearing-supports of the feeding and forming rollers are so made as to adapt them to receive different sizes and forms of rollers, so that all kinds and sizes of horseshoes can be made by the one machine, all of which will now be fully described, reference being had to the accompanying drawings, in which—

All the part of the machine are supported on the bed-plate $a$ by means of suitable standards and frames bolted thereto.

The driving-shaft $b$, provided with the heavy fly-wheel $b'$, rotates in bearings in the standards $a'\,a'$, and has secured to it the pinion $b^2$, meshing into the wheel $c$ on the shaft $c'$, supported in the standards $a^2\,a^2$, a cam on which shaft actuates the feeding and forming rollers and the cutting-off punch.

On the end of the shaft $b$ is secured the bevel-pinion $b^3$, which meshes into the bevel-wheel $d$, secured to the shaft $d'$. This shaft $d'$ rotates in bearings in the standards $a^3\,a^3$, and has also secured to it the segmental or mutilated gear-wheel $d^2$, having teeth $d^3$ on one half of its periphery only, the other half of the wheel being a plain concentric surface, $d^4$, of smaller diameter than the teeth $d^3$. The teeth of this wheel mesh into the pinion $e$, which has a large tooth or double horn-shaped projection, $e'$, the outer surface of which is concaved, so as to fit on the plain concentric surface $d^4$ of the wheel $d^2$. The pinion $e$, when in this position, is held stationary during a half-revolution of the wheel $d^2$, but makes a full revolution when the teeth $d^3$ pass around so as to mesh into its teeth, the changes from a state of rest to motion, and vice versa, being insured by the horns on the projections $e'$ passing into the undercut recesses $d^5\,d^5$, formed in the wheel $d^2$ at the juncture of the teeth $d^3$ with the plain surface $d^4$. The shaft of this pinion $e$ rotates in the bearing-standards $a^4\,a^4$, and has secured to its end the cams, &c., which actuate the folding mechanism of the machine.

The gearing above described constitutes the driving mechanism for the various members of the machine, which we will now describe in the order of their operation.

The forming and feeding rollers $f$ and $f'$ have grooves formed in their peripheries corresponding to the shape of the blanks into which it is desired to convert the bar of iron, which bar is presented to these rollers in a heated condition. Half-boxes $f^3 f^4$, fitted to slide in vertical guides on the standards $a^5 a^5$, form the bearings for the rollers $f$ and $f'$, the top boxes, $f^3 f^3$, being held down by large screws $f^5 f^5$, passing through the tops of the standards, and the lower boxes, $f^4 f^4$, being held up by the screws $f^6 f^6$, secured to them, and which fit into tapped holes formed through the miter-wheels $f^7 f^7$, said miter-wheels having bearings in bridge-pieces formed across the lower ends of the guides in the standards $a^5 a^5$. Gear-wheels $f^8 f^8$, secured to the ends of the shafts of the roller $f^2 f^2$, connect these rollers together. In line with the axis of the lower roller, $f'$, is placed the shaft $g$, having an open coupling, $g'$, on its end, into which fits the end of the shaft of the roller $f'$. This shaft $g$ rotates in bearing-boxes $g^2 g^2$, fitted to slide in guides in the standards $a^6 a^6$, and these boxes $g^2 g^2$ have secured in them the screws $g^3 g^3$, resting in tapped holes in the miter-wheels $g^4 g^4$, which are fitted to rotate only in bridge-pieces formed in the standards $a^6 a^6$. All of these miter-wheel nuts $f^7 f^7 g^4 g^4$ mesh into corresponding miter-wheels, $g^5 g^5$, secured to the shaft $g^6$, having bearings in the standards $a^5 a^6$, and provided on its end with a square, by means of which, with a suitable wrench or handle, it can be rotated, thereby raising or lowering the roller $f'$ and shaft $g$ simultaneously, and setting the upper surface of the roller $f'$ at the proper level to enable the blanks, as formed on the bar, to be fed to the other parts of the machine. This construction admits of the easy vertical adjustment of different-size rollers, which will vary with each size of shoe made, and as such also requires nice adjustment as to position in relation to the folding mechanism, which is fixed, all of the standards $a^5 a^5 a^6 a^6$ are fitted to slide on the bed $a$, but are securely fixed thereto by means of bolts passing through slotted holes in their bases, and they are caused to move together by the screws $h$, working in the ends of their bases, and having bearings in a flange projecting up from the bed $a$, each screw being provided on its end with a bevel-wheel, $h'$, in which meshes one of the bevel-pinions $h^2$, secured to the shaft $h^3$, also having bearings in the bed $a$, and provided with a square end, by which it may be rotated.

Intermittent rotary motion is imparted to the rollers $f$ and $f'$ from a crank-pin, $i$, projecting from a disk secured to the end of the shaft $c'$, which pin is connected by means of the rod $i'$ to the end of the arm $i^2$, rocking on the shaft $g$, said arm being provided with a spring dog or pawl, which catches into notches formed in the periphery of the disk $i^3$, rigidly secured to the shaft $g$. The connecting-rod $i'$ is provided with a turn-buckle or other suitable device, by which its length may be adjusted to accommodate for the different positions in which the shaft $g$ may be set.

Figure 4:
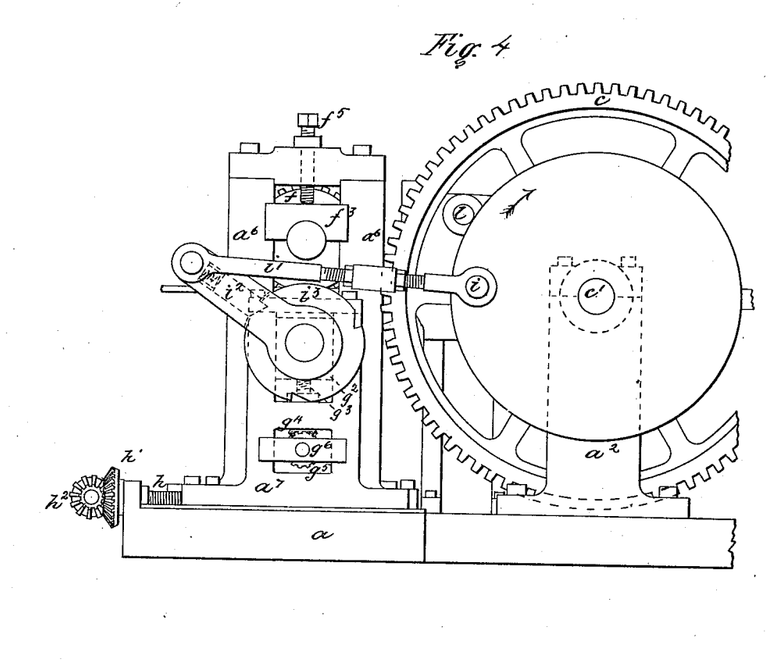
Fig. 4, Sheet 4, is a part elevation, looking toward the right-hand side, of the feeding and forming rollers.

The number of notches in the disk $i^3$ corresponds to the number of blanks the rollers $f$ and $f'$ will form while making a full revolution, which in this case is shown to be three, and when the rollers are in a position of rest, as shown, the end of the formed blank is located centrally between the two rollers $f$ and $f'$. As shown at Fig. 4, the shaft $c'$ rotates, as indicated by the arrow, and the rollers are about to move to form a blank, the preceding blank being fed into the folding mechanism.

Figures 5, 6, 7:
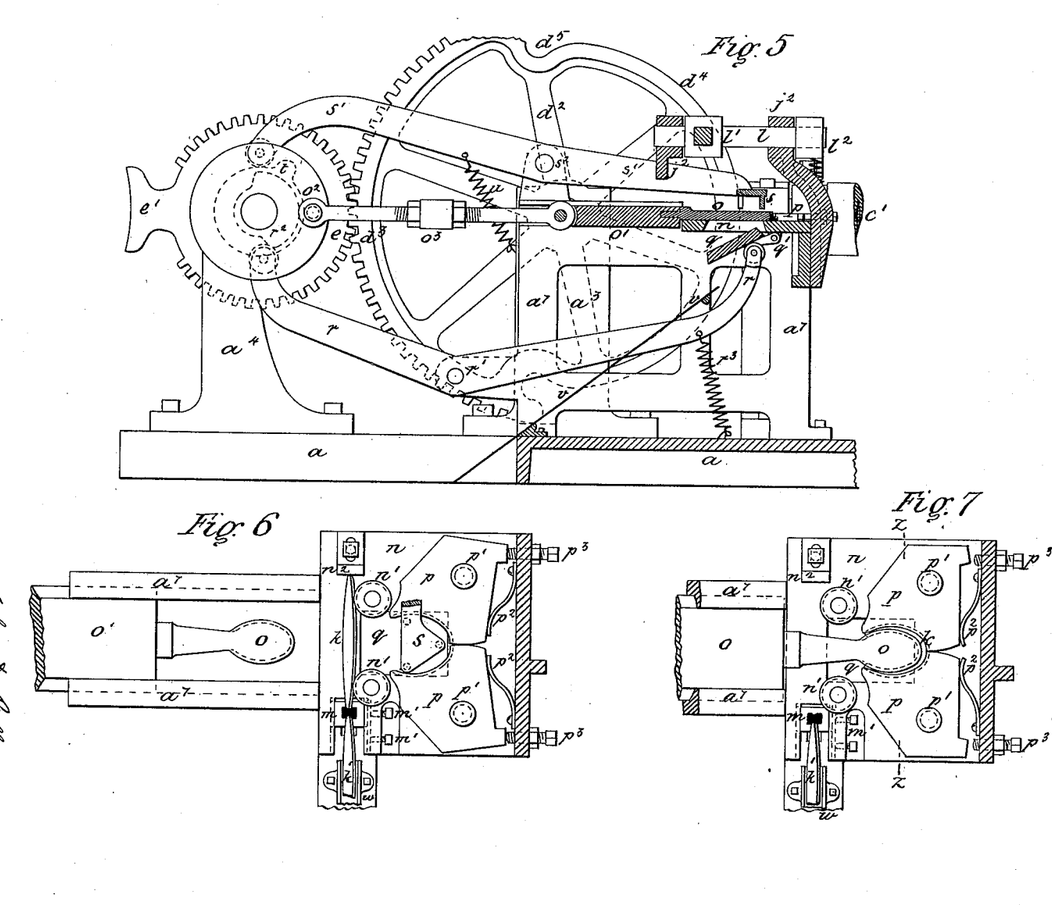
Fig. 5, Sheet 5, is a central sectional elevation of the folding mechanism, taken on the line $x\,x$, Fig. 1.
Fig. 6, Sheet 5, is a plan view of the same, showing the folders open, on an enlarged scale.
Fig. 7, Sheet 5, is a similar view, showing the folders closed, also on an enlarged scale.
Figure 8:
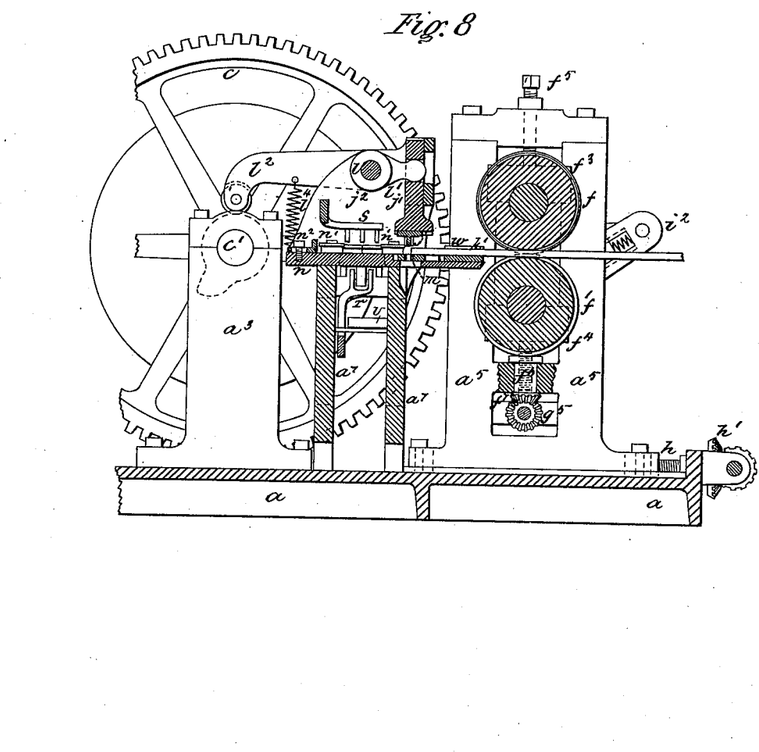
Fig. 8, Sheet 6, is a sectional elevation of the feeding and forming rollers, the cutter, and the folding device, taken on the line $y\,y$, Fig. 1.
Figure 9:
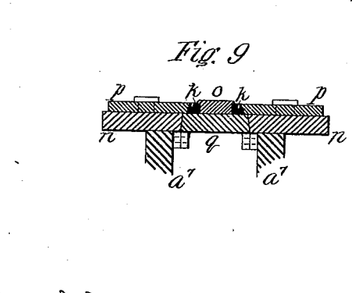
Fig. 9, Sheet 6, is a transverse section of the folding device, taken on the line $z\,z$, Fig. 7.

The cutting-off punch $j$ cuts a small piece out of the bar between two adjoining blanks, and is so shaped as to form the ends of the two adjacent blanks $k$ and $k'$, as shown at Fig. 6. It is carried by the plunger $j'$, fitted to slide in the frame $j^2$, projecting up from the frame $a^7$, which carries the folding mechanism, and in this frame $j^2$ is fitted the shaft $l$, provided with the tappet $l'$, arranged to operate the plunger $j'$ by projecting into an opening formed therein. On the end of the shaft $l$ is secured an arm, $l^2$, having a roller on its end, against which works the cam $l^3$, secured to the shaft $c'$. This end of the arm $l^2$ is pulled down against the action of the cam $l^3$, and the plunger $j'$ and punch $j$ are raised by means of the spring $l^4$.

In ways formed in the horizontal bed of the folding mechanism is secured the die $m$ by means of the set-screws $m' m'$. This die $m$ is adjustable in its ways to and from the folding mechanism, as is also the punch $j$ adjustable on the plunger $j'$, so as to be properly set to cut off different lengths of blanks.

When the blank $k$ is fed onto the horizontal table $n$, it is immediately in front of the folding-rollers $n' n'$, rotating on studs fixed in the table $n$, and the end of the blank is in contact with the adjustable stop $n^2$.

The plunger $o$, which is shaped to conform to the inside of the finished shoe, is carried by the slide $o'$, fitted in guides in the frames $a^7 a^7$, and connected at its rear end to the crank-pin $o^2$, projecting from a disk secured to the shaft of the pinion $e$, by means of the connecting-rod $o^3$, which is made adjustable as to length to enable the plunger $o$ to be set in relation to the other parts of the folding or bending mechanism. The plunger $o$ in coming forward forces the blank $k$ between the rollers $n' n'$, thereby folding the blank on the plunger, which then carries it forward into the folding-dies $p p$, pivoted on the table $n$ at $p' p'$, and held open by the springs $p^2 p^2$ against the adjustable stop-screws $p^3 p^3$. When the blank on the plunger $o$ comes in contact with the bottoms of the folding-dies $p p$, said dies are forced back, causing their sides to press the blank firmly around the plunger $o$, as shown at Fig. 7.

In the horizontal table $n$ is placed a trap-door, $q$, pivoted at $q'$ and held up by the roller on the end of the lever $r$, which is pivoted at $r'$ to a projection from the frame $a^7$, the other end of the lever having a roller which bears on the cam $r^2$, secured to the shaft of the pinion $e$. The spring $r^3$ pulls down the inner end of the lever $r$, to allow the trap-door $q$ to fall just as the plunger $o$ commences its retrograde movement. Fig. 5 shows this trap-door $q$ partly open.

The shoe $k$ is knocked off the plunger $o$ as soon as the plunger has moved back clear of the folding-dies $p$ $p$ through the opening in the table by means of the stripper $s$, which has three pins or lugs, so as to strike the shoe on the sides and front end, and it is carried on one end of the lever $s'$, pivoted at $s^2$ to the frame $a^7$, the other end of said lever being provided with a roller and actuated by the cam $t$, secured to the shaft of the pinion $e$. The stripper $s$ is raised by the spring $u$ when it has knocked the shoe off the plunger $o$. The shoe on leaving the plunger falls on the trap-door $q$, and from thence onto the chute $v$, which guides it clear of the machine. A guide, $w$, is provided, to insure the blanks, as they are formed on the bar, coming in proper position under the punch $j$.

Figure 1:
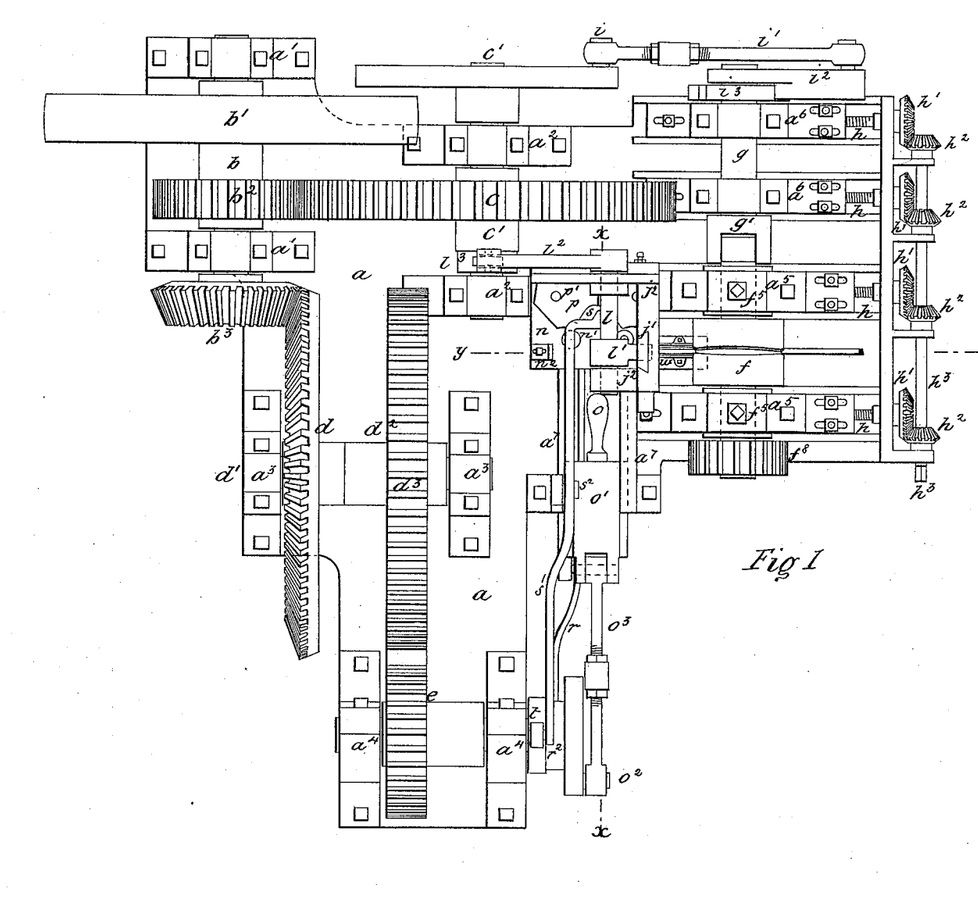
Figure 1, Sheet 1, is a general plan view of our machine for making horseshoes, drawn to a slightly smaller scale than the other views.
Figure 2:
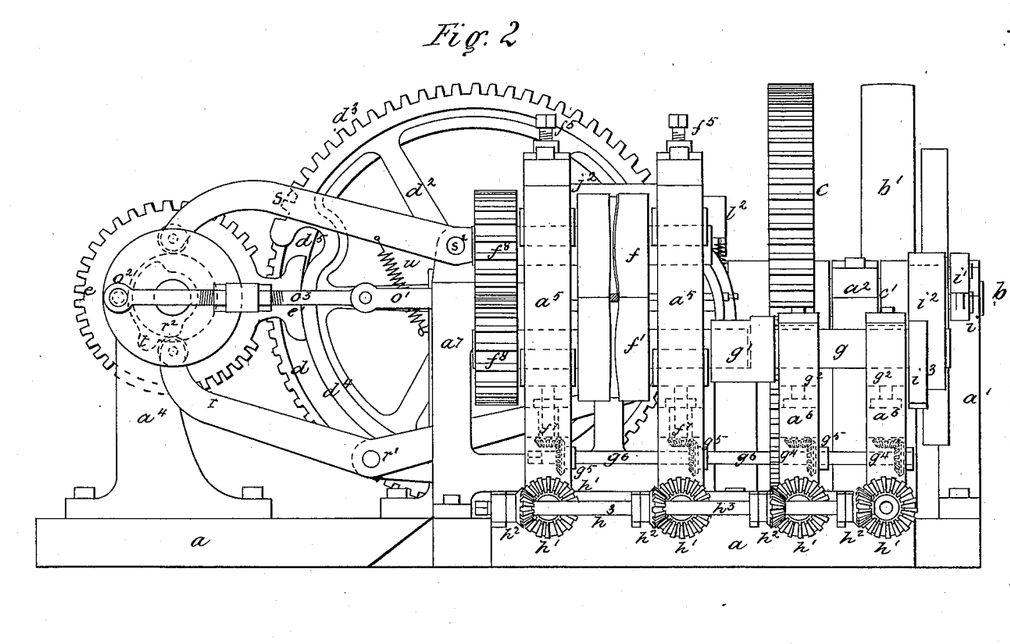
Fig. 2, Sheet 2, is an elevation, looking toward the front, of the feeding and forming rollers.
Figure 3:
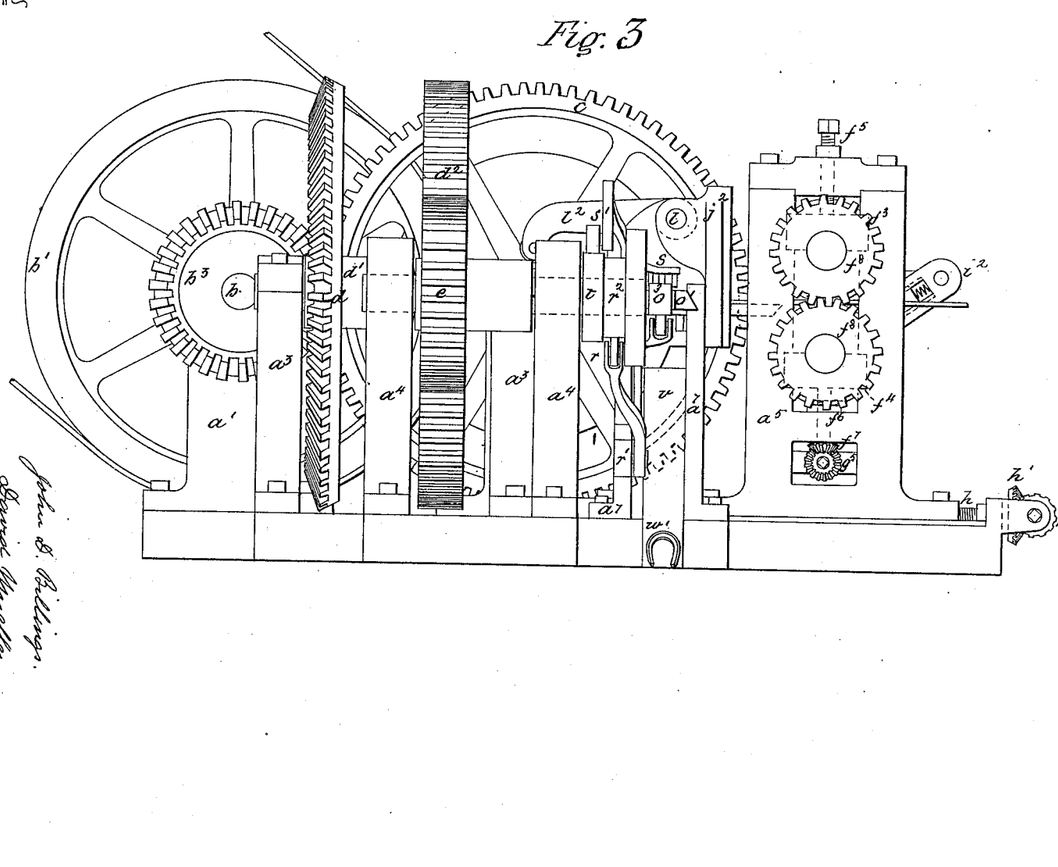
Fig. 3, Sheet 3, is a side elevation, looking toward the left-hand side, of the feeding and forming rollers.

The operation of the machine is as follows: The cams and operating mechanism of the various members being adjusted and set, as shown, to cause all the parts to work in unison, the end of the heated bar of iron is presented to the rollers $f$ and $f'$ when they are at rest. One motion of the roller-operating mechanism forms a blank, $k$, and feeds the bar forward, so that its end is directly under the punch $j$, which now operates while the rollers $f$ and $f'$ are at rest, and forms the free end of the blank $k$. Upon a repetition of the movement of the rollers $f$ and $f'$ the next blank, $k'$, is formed, the blank $k$ being fed into the folding or bending device, the adjoining ends of the two blanks $k$ and $k'$ resting directly under the punch $j$. The punch $j$ now works, separates the blank $k$ from the bar, and forms the adjoining ends of the two blanks, as shown at Fig. 6. During this operation the plunger $o$ commences to move forward, and by the time the blank $k$ is severed from the bar the plunger is in position to force the blank between the folding-rollers $n'$ $n'$, so that said blank is retained in position between the end of the plunger $o$ and the rollers $n'$ $n'$ when it is free, the stop $n^2$ forming an end guide for the same. The plunger $o$ now forces the blank through the rollers $n'$ $n'$ and into the pivoted folding-dies $p$ $p$, which are caused to firmly press the blank onto the plunger by the pressure applied to them by the end of the plunger $o$ and the shoe carried thereby, completing the bending operation, as shown at Fig. 7. Upon a retrograde movement of the plunger $o$ the folding-dies $p$ $p$ are spread out clear of the shoe on the plunger by their springs $p^2$ $p^2$, the trap-door $q$ in the horizontal table $n$, is opened and the stripper $s$ operated to knock the shoe off the plunger through the opening in the table, the chute $v$ guiding it clear of the machine, as shown at $w'$, Fig. 3. The plunger moves back into the position shown in the principal views of the drawings, and remains stationary while the rollers $f$ and $f'$ are forming another blank on the bar and feeding the end blank forward into the folding or bending device, when the bending operation is again repeated, and so on. The shoes as they leave the machine are still hot, as so little time is occupied in their formation, the machine forming and bending a shoe at each full revolution of the same; so, if it is desired to submit any particular kind of shoe to a further operation, which could not be conveniently done in the machine, or to form the nail-holes therein, the shoes may be taken from the machine as soon as formed and submitted to said further operation.

Having now described our invention, what we claim, and desire to secure by Letters Patent, is—

1. In a machine for making horseshoes, in combination, a horizontal folding or bending device, a cutter for forming the ends of the blanks and separating them from the bar adjustable to and from the folding device, and a pair of feeding and blank-forming rollers and adjustable bearing-standards, whereby horseshoes of any shape or size may be made at one operation, substantially as set forth.

2. In a machine for making horseshoes, in combination, a pair of feeding and forming rollers, their bearing-standards, a driving-shaft provided with a coupling in line with one of the rollers, sliding bearing-standards for said shaft, and connected gearing and screws for moving all the standards simultaneously, substantially as set forth.

3. In a machine for making horseshoes, in combination, two main shafts placed at right angles to each other, a driving-shaft connected thereto by means of gear-wheels, a pair of rollers intermittently driven from one of the main shafts by means of a crank, connecting-rod, and crank-arm, a cutter also operated from this main shaft by means of a cam thereon, and a folding or bending device operating at right angles to the direction of movement of the bar fed by the rollers and actuated by means of a mutilated gear on the second main shaft, substantially in the manner set forth.

4. In a machine for making horseshoes, in combination, a pair of feeding and blank-forming rollers arranged to feed the blank-bar horizontally, a vertically-arranged cutter for separating the blanks and forming their ends, and a folding-plunger and folders arranged to operate horizontally at right angles to the direction of motion of the blank-bar fed by the rollers, substantially as set forth.

5. In a machine for making horseshoes, in combination, a pair of feeding and blank-forming rollers, standards provided with sliding boxes for the same, a shaft having an open coupling in line with the lower roller, standards and sliding boxes for said shaft, and screws and gearing for raising or lowering the roller and driving-shaft simultaneously, substantially as set forth.

6. In a machine for making horseshoes, in combination, a pair of feeding and blank-forming rollers, a driving-shaft in line with the lower roller and coupled thereto, horizontally-sliding standards provided with vertically-sliding boxes, adjusting-screws and gears connecting all the standards together, whereby they may be simultaneously horizontally adjusted, and adjusting-screws and gears connecting the lower sliding boxes, whereby the shaft and rollers may be simultaneously vertically adjusted, substantially as set forth.

7. In a machine for making horseshoes, in combination, a pair of feeding and blank-forming rollers, a driving-shaft in line with the lower roller and coupled thereto, horizontally-sliding standards provided with vertically-sliding boxes, adjusting-screws and gears connecting all the standards together, whereby they may be simultaneously horizontally adjusted, and adjusting-screws and gears connecting the lower sliding boxes, whereby the shaft and rollers may be simultaneously vertically adjusted, a ratchet wheel secured to the shaft, a pawl-arm, a rotating crank, and adjustable connecting-rod connecting the end of the pawl-arm to the rotating crank, substantially as set forth.

8. In a machine for making horseshoes, a folding device consisting of a horizontally-moving former, a pair of folding-rollers, a pair of pivoted folders behind the rollers, a horizontal table, and trap-door formed therein, through which the formed shoes are discharged, and a stripping device for forcing the formed shoes off the former, in combination, substantially as set forth.

9. In a machine for making horseshoes, in combination, the rollers $f f'$, sliding boxes $f^3 f^4$, coupling-shaft $g$, boxes $g^2 g^2$, screws $f^6 f^6 g^3 g^3$, miter-wheels $f^7 f^7 g^4 g^4$, the standards $a^5 a^5 a^6 a^6$, and shaft $g^6$, provided with the miter-wheels $g^5 g^5$, substantially as set forth.

10. In combination, the bed $a$, the standards $a^5 a^5$, carrying the rollers $f f'$, the standards $a^6 a^6$, carrying the coupling-shaft $g$, the screws $h h$, provided with bevel-wheels $h' h'$, and the shaft $h^3$, provided with bevel-wheels $h^2 h^2$, substantially as and for the purpose set forth.

11. In combination, the bed $a$, the standards $a^5 a^5$, carrying the rollers $f f'$, the standards $a^6 a^6$, carrying the coupling-shaft $g$, the screws $h h$, provided with bevel-wheels $h' h'$, the shaft $h^3$, provided with bevel-wheels $h^2 h^2$, the sliding boxes $f^3 f^4 g^2 g^2$, having screws $f^6 f^6 g^3 g^3$, the miter-wheels $f^7 g^4$, and the shaft $g^6$, provided with miter-wheels $g^5 g^5$, substantially as and for the purpose set forth.

12. In combination, the rollers $f$ and $f'$, the coupling-shaft $g$, the notched disk secured thereto, the pawl arm $i^2$, the connecting-rod $i'$, and the crank $i$, substantially as and for the purpose set forth.

13. In combination, the rollers $f$ and $f'$, the coupling-shaft $g$, the notched-disk secured thereto, the pawl-arm $i^2$, the connecting-rod $i'$, the crank $i$, the shaft $c'$, the cam $l^3$, the arm $l^2$, the plunger $j'$, punch $j$, and die $m$, substantially as and for the purpose set forth.

14. In a machine for making horseshoes, the combination, with a folding or bending device, of the adjustable punch and die $j m$, and adjustable forming and feeding rollers $f$ and $f'$, substantially as and for the purpose set forth.

15. In combination, the horizontal plunger $o$, the folding-rollers $n' n'$, the punch and die $j m$, the adjustable stop $n^2$, and the feeding-rollers $f f'$, substantially as and for the purpose set forth.

16. In combination, the horizontal plunger $o$, the folding-rollers $n' n'$, the punch and die $j m$, the adjustable stop $n^2$, the feeding-rollers $f f'$, the horizontal table $n$, and folding-dies $p p$, substantially as and for the purpose set forth.

17. In combination, the horizontal plunger $o$, the folding-rollers $n' n'$, the punch and die $j m$, the adjustable stop $n^2$, the feeding-rollers $f f'$, the folding-dies $p p$, the trap-door $q$, and the stripper $s$, substantially as and for the purpose set forth.

18. In combination, the plunger $o$, carried by slide $o'$, the adjustable connecting-rod $o^3$, the crank $o^2$ on the shaft of the pinion $e$, the rollers $n n'$, the stop $n^2$, punch and plunger $j j'$, tappet and arm $l' l^2$, and cam $l^3$ on the shaft $c'$, substantially as and for the purpose set forth.

19. In combination, the plunger $o$, connecting-rod $o^3$, crank $o^2$, folding-dies $p p$, horizontal table $n$, trap-door $q$, lever $r$, and cam $r^2$, substantially as and for the purpose set forth.

20. In combination, the plunger $o$, connecting-rod $o^3$, crank $o^2$, folding-dies $p p$, horizontal table $n$, trap-door $q$, lever $r$, cam $r^2$, stripper $s$, lever $s'$, and cam $t$, substantially as and for the purpose set forth.

21. The mutilated wheel $d^2 d^3 d^4 d^5$, in combination with the pinion $e$, provided with horned projection $e'$, having a concave face, substantially as and for the purpose set forth.

22. The plunger $o$, the folding-dies $p p$, the horizontal table $n$, the trap-door $q$, the stripper $s$, and the chute $v$, substantially as and for the purpose set forth.

23. In combination, the plunger $o$, connecting-rod $o^3$, crank $o^2$, folding-dies $p p$, horizontal table $n$, trap-door $q$, lever $r$, cam $r^2$, the punch and die $j m$, and the feeding-rollers $f f'$, substantially as and for the purpose set forth.

24. In a machine for making horseshoes, in combination, the mutilated wheel $d^2 d^3 d^4 d^5$, the pinion $e$, connected by its shaft to the folding or bending mechanism, the wheel $c$, rotating in a plane at right angles to $d^2$ and $e$, and connected by its shaft to the feeding-rollers and cutting-off punch by means substantially as described, whereby the feeding-rollers and punch and folding device are alternately operated, and the driving-shaft $b$ and connecting-gear $b^2$ $b^3$ $d$, substantially as set forth.

In testimony whereof we have hereunto set our hands, at New York, county and State of New York, this 2d day of April, 1885.

JOHN D. BILLINGS.
DAVID MUELLER.

Witnesses:
H. D. WILLIAMS,
JAS. T. COWLEY.